Patented Mar. 28, 1944

2,345,061

UNITED STATES PATENT OFFICE 2,345,061

ORGANIC COMPOUND AND PROCESS FOR PRODUCING THE SAME

Gilbert De Wayne Miles, New York, N. Y., assignor to Colgate-Palmolive-Peet Company, Jersey City, N. J., a corporation of Delaware No Drawing. Application February 27, 1942, Serial No. 432,643

12 Claims. (Cl. 260—400)

The present invention relates to a new class of organic compounds, and more particularly, to novel metal salts of mixed organic acids adapted for use as wetting agents, detergents, emulsifiers, foam breakers, demulsifiers, water repellents, water-proofing compounds, etc.

It is an object of the present invention to provide a new class of organic compounds of relatively simple structure and inexpensive manufacture which is capable of satisfactory use for various purposes in connection with emulsification, foaming, etc.

It is also an object of the invention to provide a novel organic metal salt having surface-active and surface tension-modifying characteristics.

A further object of the invention is to provide a novel mixed or complex organic salt of a metal having a valence greater than unity.

Broadly stated, the novel organic compounds of this invention are complex metal salts of a carboxylic acid and of an acid organic derivative of a polybasic, oxygen-containing, inorganic acid. Each molecule thus comprises a polyvalent metal cation constituent and at least two types of anion constituents. The metal cation constituent of the new compound has at least one valence attached to a carboxylic acid anion constituent and at least one valence attached to the anion constituent of an acid organic derivative of an inorganic acid. The metal may be bivalent, in which case the novel compound of the invention contains one equivalent of each type of anion; or it may have a valence of 3 or more, in which case at least one equivalent of each type of anion is present in each molecule, the remaining valence or valences of the cation being occupied by another or other equivalents of either or both types of anion and/or by other organic or inorganic anions or both. As used herein, the term "polyvalent" applied to a metal signifies that the metal has a valence of at least 2.

Looking at the new compound from another viewpoint, it may be considered that the metal cation links a carboxylic acid group, e. g., an aliphatic carboxylic acid anion, with an inorganic acid anion of an organic acid ester, e. g., an organic sulphonic acid anion. As aforesaid, the metal employed must have a valence greater than one, and the following metals have been found to be suitable for use as the polyvalent cation constituents or links: calcium, magnesium, lead, tin, iron, cadmium, zinc, aluminum, cupric copper, barium, strontium, mercuric mercury, chromium, manganese, cobalt and nickel. Where the metal cation has a valence greater than two, more than the single carboxylic group and/or more than the single sulphated or sulphonated group can be incorporated in the molecule and/or other anions having neither of these characteristics may be attached to the metal cation. Thus, for example, aluminum or other trivalent element may link two aliphatic carboxylic acid anions with one sulphonated organic acid anion, or one aliphatic carboxylic acid anion with two sulphonated organic acid anions, or one of each of aliphatic carboxylic acid and sulphonated organic acid anions with a chloride, hydroxide or other anion not falling into either of these groups.

The carboxylic acid group attached to at least one valence of the metal may be of low, moderately high, or very high molecular weight, depending upon the particular properties desired. The carboxylic acid group may have an aromatic, aliphatic, alicyclic or heterocyclic radical or various combinations of these radicals and may be monobasic or polybasic, saturated or unsaturated, and may be of straight or branched chain, substituted or unsubstituted. As sources of the carboxylic group, myristic acid, palmitic acid, benzoic acid, naphthenic acid, acetic acid, isobutyric acid, caproic acid, undecyclenic acid, undecanoic acid, glyceric acid, sulphoacetic acid, linoleic acid, hexacosanoic acid, oxalic acid, citric acid, sulphosuccinic acid, chloroacetic acid, furoic acid, chlorpropionic acid, nicotinic acid, melissic acid or mixtures of these acids can be employed. Among the aliphatic acids of moderately high molecular weight (about 12 to about 20 carbon atoms to the molecule) available as sources for the carboxylic group are lauric acid, oleic acid, ricinoleic acid, stearic acid, myristic acid, palmitic acid, linoleic acid, mixed coconut oil fatty acids, mixed tallow fatty acids or mixtures of these acids.

The anion of the acid organic derivative of an inorganic acid attached to at least one other valence of the metal may also be of low, moderately high or very high molecular weight, as desired and according to the properties sought. The organic part of the group may be aromatic, aliphatic, alicyclic or heterocyclic, monobasic or polybasic, saturated or unsaturated, straight or branched chain, substituted or unsubstituted. The inorganic acid part of the group is a polybasic oxygen-containing acid anion, including sulphates and sulphonates, borates and sulphoborates, ortho-, tetra-, pyro- and polymetaphosphates, phosphites, etc., and the group is preferably the anion of an organic sulphonic acid, that is, of an organic sulphuric or true organic sulphonic acid. This may be a compound of the type known and used as synthetic detergents and wetting agents. Moreover, the organic elements with which the inorganic acid radical is combined may have not only organic substituents, such as alkoxy, acyloxy, and ketonic groups, etc., but may also have inorganic substituents, such as unesterified hydroxyl groups, thiosulphates, halogens, halogenoids including cyanides, cyanates, thiocyanates, etc., and the like.

The organic sulphonate groups of moderately high molecular weight (about 12 to about 20 carbon atoms to the molecule) comprised by the novel compositions of the invention may be prepared from organic materials which are applicable for sulphonation ("true" sulphonation and/or sulphation), including fatty oils, unsaturated fatty acids, mineral oils, mineral oil extracts, mono- and di-glycerides, partial esters or ethers of polyglycerols, esters or ethers of glycols, polyglycols, and polyalcohols, aromatic and alkylated aromatic compounds, alcohols and olefines, coal tar distillates, and numerous other organic compounds and mixtures of compounds. Such compounds can be sulphonated by any of several methods and may form any of several products, depending upon the method of sulphonation employed. The sulphated or sulphonated organic compounds include sulphonated mineral oil; conventional mineral oil refinery sludges; sulphonated mineral oil extracts, including the products described in U. S. Patents Nos. 2,149,661, 2,149,662 and 2,179,174; sulphonated fatty acids and oils, including sulphonated castor oil, sulpho-ricinoleic acid, sulphonated olive oil, and sulpho-oleic acid; aliphatic sulphonates and sulphates, including cetyl sulphuric acid, dodecyl acid sulphate, and tetradecanehydroxy sulphonic acid-1,2; aliphatic ether and ester sulphonates including the dodecyl ether of hydroxy ethyl sulphonic acid, the cetyl ether of glyceryl sulphonic acid, tallow monoglyceride monosulphate, and coconut oil fatty acid monoesters of beta methyl glycerine sulphonic acid; sulphonates prepared by treatment of organic materials with sulphur dioxide and chlorine in the presence of light and hydrolysis of the product; sulphonates prepared by treatment of organic bodies with sulphuryl chloride and an activating agent in the presence of light and hydrolysis of the product; fatty acid amides of amino alkyl sulphonic acids, including lauric amide of taurine and tall oil acid amide of amino glyceryl sulphonic acid; sulphonic acids of naphthenes and naphthenic acids; lignin sulphonic acids; aromatic and alkylated aromatic sulphonic acids, including naphthalene sulphonic acid, octadecyl benzene sulphonic acid, and dodecyl naphthalene sulphonic acid; the product of a mineral oil extract sulphonated while dissolved in liquid sulphur dioxide; and innumerable other organic sulphonic and sulphuric acid derivatives or mixtures thereof. These organic sulphate and true sulphonate compounds may include water-soluble detergents, whether the organic radicals of the molecule are "pure" or contain substituents such as halogens, halogenoids, hydroxyls, nitrogen-containing groups, acyloxy groups, alkoxy groups, ketonic groups, etc.

While the above materials of moderately high molecular weight are preferred to be employed, particularly for admixture and reaction with salts of carboxylic acids of moderately high molecular weight, in the preparation of certain types of surface-active agents, compounds of lower or higher molecular weight can alternatively be used. Thus, the source of the sulphated or sulphonated organic groups comprised by the novel compositions of the invention may include ethyl sulphuric acid, butyl sulphuric acid, taurine, hydroxy ethyl sulphonic acid, dehydrothiotoluidine sulphonic acid, anthraquinone beta-sulphonic acid, 2-hydroxy-6-naphthalene sulphonic acid, sulphonated resins, etc.

In preparing the novel compounds of this invention, many methods may be employed, as will be understood by those skilled in the art from the disclosures in the present specification. One procedure is to dissolve a water-soluble salt of the carboxylic acid together with a water-soluble salt of the acid organic derivative of the polybasic oxygen-containing inorganic acid in water and then to add an amount of an aqueous solution containing at least substantially an equivalent of a water-soluble salt of the metal desired. A precipitate forms, and the solution is thereafter cooled and filtered. The precipitate recovered comprises the novel metal mixed salt of the invention.

Another method is to mix a solution of a water-soluble salt of the carboxylic acid together with a solution of the desired metal salt of the acid organic derivative of the polybasic oxygen-containing inorganic acid. Upon digesting at a moderate temperature, a precipitate comprising the metal mixed or complex salt of this invention is formed.

Similarly, the freshly prepared carboxylic acid salt of the desired metal may be mixed with a solution of a water-soluble salt of the acid organic derivative of the polybasic oxygen-containing inorganic acid to precipitate the mixed salt of the present invention.

The mixed salt may also be prepared by freshly preparing the carboxylic acid salt of the desired metal and mixing the same with a solution of the desired metal salt of the acid organic derivative of the polybasic oxygen-containing inorganic acid. The precipitate formed is then separated.

A preferred process of preparing these complex compounds is to mix the free acid organic derivative of the polybasic oxygen-containing inorganic acid with the carboxylic acid salt of the desired metal in a medium which is a solvent for the free carboxylic acid to be produced in the reaction and which is preferably not a solvent for the desired metal mixed salt. Among various organic solvents, preferably anhydrous, which give satisfactory results in this modification are aliphatic and cycloaliphatic hydrocarbons, including gasoline and other petroleum products; aromatics and alkyl aromatics, including benzene, toluol, the xylols, etc.; ethers; halogenated hydrocarbons, including ethylene dichloride, carbon tetrachloride, etc., and the like. Where the solvent selected as a medium also dissolves the mixed salt formed, a solvent wherein it is insoluble may be used to precipitate it. Depending upon the solvent employed (e. g., benzol), a gel is sometimes produced, and this may be treated with a preferred solvent to yield a precipitate comprising the metal mixed or complex salt of the invention.

It will be understood from the foregoing that the concentrations of the respective reacting salts are high enough to exceed the solubility product of the metal mixed salt of the invention, that is, to exceed the product of the concentration of the ions of the complex metal salt in its saturated solution. On the other hand, the concentration of one of the salts does not exceed that of the other (or others) by such an amount as to cause substantially increased solubility of the desired metal mixed salt and to prevent precipitation.

When employing a bivalent metal, such as calcium or magnesium, it is preferred to control the proportion of the salts of the carboxylic acid and of the organic acid derivative of the polybasic oxygen-containing inorganic acid. Thus, an excess of the salt of a sulphonated organic compound can be used in preference to an excess of an aliphatic carboxylic acid salt, since the metal salts of the sulphonated organic acids are generally soluble, so that they do not contaminate the product of the invention upon filtering. The metal soaps or metal salts of the aliphatic carboxylic acids, on the other hand, are generally insoluble in water and would, therefore, appear as impurities upon filtering off the mixed salts.

Similarly, when metals having a valence greater than 2 are employed, the proportions of aliphatic carboxylic acid salts and sulphonated organic acid salts are preferably controlled to get the desired compounds. For example, a trivalent metallic element can be attached by two of its valences to aliphatic carboxylic acid anions and by the other valence to a single sulphonated organic acid anion, or, contrariwise, such trivalent metallic element can be attached by two valences to sulphonated organic acid anions and by a single valence to the aliphatic carboxylic acid anion. It has been found that a mixture of these compounds will form, especially where the proportions of the anions is somewhere between 1:2 and 2:1. In the presence of other anions, such as halides, hydroxides, etc., one or more valences of the metal may be attached to such other anion or anions.

As formed, the precipitated mixed metal salts are sometimes mixed with metal soaps, usually produced either by reason of an excess of soluble soap employed as a starting material or because equilibrium conditions require the presence of the metal soaps.

The mixed salts formed have surface-active properties, and the character of these properties is largely determined by the molecular weight of the carbon chains in the respective anions attached to the metallic element and by their proportionate weight with respect to each other. Thus, where the anions are monobasic and are respectively aliphatic carboxylic acid anion and sulphonated organic acid anion and each is of moderately high molecular weight, say, about 12 to about 20 carbon atoms to the molecule, the novel mixed salt formed has properties which make it satisfactory for use as a foam breaker and demulsifier. For example, when distilling volatile material from a solution containing a foaming agent, the addition of such salt prevents foaming. It may also be desirable to form the salt in situ in an emulsion by addition thereto of a higher fatty acid and a soluble salt of a metal having a valence of at least 2. In addition, these salts may be used for breaking petroleum water-in-oil emulsions. The various mixed salts of the invention may be employed for various other purposes, as will be set forth hereinafter.

The following examples, described herein, are merely illustrative of the present invention, and it will be understood that the invention is not limited thereto.

*Example I*

Sodium laurate is mixed in water with about a molar equivalent of sodium lauryl sulphate, and an amount of calcium chloride substantially equivalent to both is stirred into the mixture at room temperature. A white precipitate is formed and is washed free of sodium chloride with water at about 40° to about 50° C. The material, thus purified, is dried in an evacuated desiccator over concentrated sulphuric acid. The calcium laurate-lauryl sulphate obtained shows an analysis for calcium and sulphur, respectively, of 8.13% and 6.40%, as against calculated theoretical values of 7.93% and 6.35%, respectively, for the pure mixed salt. The product is a good foam preventive and emulsion breaker.

*Example II*

Approximately molar equivalents of sodium laurate and sodium lauryl sulphate are dissolved in a solvent comprising aqueous ethyl alcohol, and an ethyl alcohol solution of a molar equivalent of calcium chloride is added to the mixture, the temperature being raised to about 55° C. and kept at this temperature for about two hours. A precipitate is formed, which, upon cooling and settling of the mixture, can be filtered off. The solid material is washed with water and then with ethyl alcohol, and is dried at about 110° C. The product, a white solid, has good antifoaming and demulsifying properties. Treatment of a definite amount with dilute hydrochloric acid and subsequent extraction with a solvent (a low-boiling petroleum ether sold under the trade name of "Skellysolve") yields an amount of lauric acid which is about 94% of the calculated theoretical amount which would be produced by the same treatment of caucium laurate-lauryl sulphate.

*Example III*

Substantial equivalents of sodium laurate and sodium lauryl sulphate are dissolved in water, and about two equivalents of calcium hydroxide are added thereto. The calcium hydroxide is added alternately with hydrochloric acid to maintain a pH of about 9.5 to about 10.5. The mixture is heated moderately, and a precipitate is formed. The precipitate is washed with water at about 40° to about 50° C. and, until free of chloride, is adjusted to a pH of about 9.5 by additions of calcium hydroxide. The white precipitate formed is filtered and dried in an evacuated desiccator over concentrated sulphuric acid.

*Example IV*

To an aqueous solution of a sodium organic sulphonate prepared by treating hexadecane with a mixture of sulphur dioxide and chlorine in the presence of light and neutralizing the resulting organic sulphonyl chloride with caustic soda, a molar equivalent of freshly prepared calcium stearate is added. The mixture is digested for about two hours at a moderate temperature of about 40° to about 50° C., and the resulting precipitate comprises a calcium stearate-organic sulphonate.

*Example V*

A mineral oil is extracted with liquid sulphur dioxide, and the extract comprising aromatic components of the mineral oil is sulphonated with oleum, the product being neutralized with caustic. The neutralized and purified product is then treated in ethyl alcohol with calcium chloride to form the calcium salt of the sulphonated mineral oil extract. The alcohol is removed, and the calcium salt is dissolved in aqueous solution and mixed with a molar equivalent of sodium palmitate. The mixture is digested at moderate temperature to form a precipitate of a calcium palmitate-aryl sulphonate. The precipitate is washed with water at about 45° C. to remove sodium aryl sulphonate formed in the reaction, and it is then dried at about 100° C.

Example VI

The calcium salts of the sulphuric acid esters of coconut oil fatty acid monoglycerides are dissolved in water, and a substantially equivalent amount of freshly prepared calcium oleate is added thereto. The mixture is digested at about 50° C. for about 2 to about 3 hours and is then permitted to settle. The precipitate is washed with warm water and is found to comprise calcium oleate-sulphate of coconut oil fatty acid monoglycerides.

Example VII

Substantially molar equivalent amounts of calcium acetate and lauryl sulphuric acid are mixed in a benzol solution, and, after reaction, the reaction mixture is treated with ether. A precipitate comprising calcium acetate-lauryl sulphate is formed. The precipitate is washed with water and is filtered and dried.

Example VIII

Lauryl sulphuric acid is prepared by treating lauryl alcohol dissolved in liquid sulphur dioxide with chlorsulphonic acid and is isolated as a very hygroscopic white solid. A quantity of the acid is mixed with a substantially molar equivalent amount of magnesium laurate suspended in benzol. Upon treatment with ether, a white solid is produced. A substantial equivalent of lauric acid is recovered from the benzol-ether mixture, indicating that the white precipitate formed is magnesium laurate-lauryl sulphate.

Example IX

The procedure of Example VIII is repeated, using benzene sulphonic acid instead of lauryl sulphuric acid and employing calcium laurate in place of magnesium laurate. The resulting precipitate comprises calcium laurate-benzene sulphonate.

Example X

The procedure of Example VIII is repeated, using lauryl sulphuric acid and employing zinc laurate in place of magnesium laurate. The resulting precipitate comprises zinc laurate-lauryl sulphate.

Example XI

The procedure of Example VIII is repeated, using cetyl sulphuric acid instead of lauryl sulphuric acid and employing the calcium soaps of coconut oil fatty acids in place of magnesium laurate. The resulting precipitate comprises coconut oil fatty acids-cetyl sulphuric acid calcium salt.

Example XII

About 2 gram mols of sodium lauryl sulphate and about 1 gram mol of sodium laurate are dissolved in water, and about a gram mol of calcium chloride is mixed therewith, the pH of the mixture being maintained at about 9.0 by addition of sodium hydroxide. Upon digesting at a moderate temperature, a white precipitate is formed, which is washed with water at about 40° to about 50° C.

The white precipitate gives an analysis of 7.98% calcium and 6.99% sulphur, as compared with calculated theoretical values of 7.93% for calcium and 6.35% for sulphur in calcium laurate-lauryl sulphate.

The various polyvalent metal compounds of this invention may be used for various purposes. They may be employed as and for washing compositions for wood, metal, stone, glass, brick, masonry and painted surfaces; insecticides; cements; abrasive compositions; antiseptics; water softeners; deodorants and disinfectants; water paints and polishes; sizes, glues, and adhesives; cosmetics; laundry detergents and other textile agents including laundry blueing, bleaching, dyeing, mercerizing, softening, lubricating, and discharging compositions; depilatories; dust-preventing compositions; anti-freezing, anti-fogging, and anti-corrosion compositions; wood impregnants; electrolytic baths; etching compositions; metal pickling; tanning agents and fat-liquors for leather; photographic solutions; petroleum de-emulsifying compositions; lubricating oils and greases; fuel compositions; ore flotation agents; fat splitting; preparation of dyes and dye intermediates; preparation of resins and plasticizers; pigment dispersing compositions; paint dryers; and any compositions requiring wetting, waterproofing, washing, emulsifying, de-emulsifying, penetrating, solubilizing, desolubilizing, foam breaking, dispersing and like agents.

The metal mixed salts, with or without one or more addition agents, may be formed into beads, flakes, bars, chips, crystals, powders, pastes, salves or other forms.

Although the present invention has been described in connection with illustrative examples and particular embodiments thereof, it will be understood by those skilled in the art that various equivalents may be substituted therefor and that other variations and modifications of the invention can be made without departing from the principles disclosed herein. Such variations and modifications are believed to be within the scope of the present specification and within the purview of the appended claims.

I claim:

1. As a new composition of matter, a polyvalent metal salt of a carboxylic acid and of an organic-substituted, polybasic, oxygen-containing, inorganic acid, said acid groups being connected through the polyvalent metal.

2. As a new composition of matter, a polyvalent metal mixed salt of an aliphatic carboxylic acid and of an organic-substituted, oxygen-containing, sulphur-containing, inorganic acid, said acid groups being connected through the polyvalent metal.

3. As a new composition of matter, a mixed salt of a polyvalent metal having at least one valence attached to an aliphatic carboxylic group and having at least one valence attached to an organic sulphonate group.

4. As a new composition of matter, a mixed salt of a polyvalent metal having at least one valence attached to an aliphatic carboxylic group of about 12 to about 20 carbon atoms and having at least one valence attached to an organic sulphonate group of about 12 to about 20 carbon atoms.

5. As a new composition of matter, a mixed salt of a bivalent metal having one valence attached to an aliphatic carboxylate group and having its other valence attached to an organic sulphonate group.

6. As a new composition of matter, a mixed salt of a bivalent metal having one valence attached to an aliphatic carboxylate group of about 12 to about 20 carbon atoms and having its other valence attached to a sulphated organic group of about 12 to about 20 carbon atoms.

7. As a new composition of matter, a salt having the general formula:

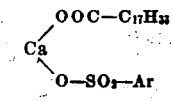

where Ar is an aryl group.

8. As a new composition of matter, a salt having the formula:

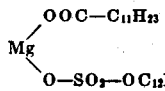

9. A process for preparing metal compositions which comprises reacting a free acid organic derivative of a polybasic, oxygen-containing, inorganic acid with a carboxylic acid salt of a polyvalent metal.

10. A process for preparing metal compositions which comprises reacting a free acid organic derivative of a polybasic, oxygen-containing, inorganic acid with a carboxylic acid salt of a polyvalent metal to form a polyvalent metal mixed salt and a free carboxylic acid, dissolving the free carboxylic acid, and recovering the polyvalent metal mixed salt.

11. A process for preparing metal compositions which comprises mixing a free organic sulphonic acid with an aliphatic carboxylic acid salt of a polyvalent metal in the presence of an organic solvent wherein the free aliphatic carboxylic acid of said salt is soluble to form a polyvalent metal mixed salt, and removing the polyvalent metal mixed salt from the solution.

12. A process for preparing metal compositions which comprises mixing a free organic sulphonic acid of about 12 to about 20 carbon atoms with a suspension of an aliphatic carboxylic acid salt of a polyvalent metal having about 12 to about 20 carbon atoms in an organic solvent for the free aliphatic carboxylic acid of said salt to form a polyvalent metal mixed salt and a free aliphatic carboxylic acid, and recovering the polyvalent metal mixed salt from the solution of the free aliphatic carboxylic acid.

GILBERT DE WAYNE MILES.